United States Patent
Adams et al.

(10) Patent No.: US 12,494,848 B1
(45) Date of Patent: Dec. 9, 2025

(54) SYSTEM FOR COMMUNICATION, TRACKING, AND RANGING USING AN OPTICAL LINK

(71) Applicant: AMAZON TECHNOLOGIES, INC., Seattle, WA (US)

(72) Inventors: Jeff Clark Adams, Seattle, WA (US); Donald Mitchell Cornwell, Bellevue, WA (US); Endri Kerci, Mountlake Terrace, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 199 days.

(21) Appl. No.: 18/316,504

(22) Filed: May 12, 2023

(51) Int. Cl.
  *H04B 10/516* (2013.01)
  *H04B 10/50* (2013.01)
  *H04B 10/564* (2013.01)
  *H04B 10/60* (2013.01)

(52) U.S. Cl.
  CPC ......... *H04B 10/516* (2013.01); *H04B 10/503* (2013.01); *H04B 10/564* (2013.01); *H04B 10/60* (2013.01)

(58) Field of Classification Search
  CPC .. H04B 10/516; H04B 10/503; H04B 10/564; H04B 10/60; H04B 10/54; H04B 10/50; H04B 10/508; H04B 10/505; H04B 10/58; H04B 10/40; H04B 10/548; H04J 14/0276; H04J 3/14
  See application file for complete search history.

(56) References Cited

U.S. PATENT DOCUMENTS

| 11,329,728 | B1* | 5/2022 | Adams | H04B 10/532 |
| 2017/0192408 | A1* | 7/2017 | Nazarathy | G05B 13/04 |
| 2024/0235687 | A1* | 7/2024 | Adleman | H04B 10/503 |

OTHER PUBLICATIONS

"Pseudo-Noise Ranging Systems—CCSDS 414.0-G-2", Green Book, Report Concerning Space Data Systems Standards, The Consultative Committee for Space Data Systems, Feb. 2014, 92 pgs. Retrieved from the Internet: URL: http://mtc-m16c.sid.inpe.br/col/sid.inpe.br/mtc-m18/2010/12.03.13.41/doc/CCSDS%20414.0-G-2.pdf.

Hamkins, et al., "Telemetry Ranging: Concepts", IPN Progress Report 42-203, Nov. 15, 2015, 20 pgs. Retrieved from the Internet: URL: https://ipnpr.jpl.nasa.gov/progress_report/42-203/203C.pdf.

* cited by examiner

*Primary Examiner* — Hibret A Woldekidan
(74) *Attorney, Agent, or Firm* — Lindauer Law, PLLC

(57) ABSTRACT

Satellites may communicate using an optical communication system that provides high bitrate communication while also facilitating tracking, ranging, and low bitrate communication. Light modulated with a high bitrate signal is also modulated to include a set of orthogonal tones used for tracking, ranging, and low bitrate data. A continuous tracking tone may be sent to facilitate acquisition and tracking at the receiver. Timing signals may be exchanged using the tones. These may be used to calculate range between the satellites or provide precision time synchronization. One or more of these tones may be modulated to send low bitrate data. At the receiving device, the incident light may be detected by a first detector with a wide field of view, such as a quad cell detector, and the tones detected. With tracking established, the incident light is directed on a second detector and the high bitrate signal is detected.

20 Claims, 9 Drawing Sheets

SYSTEM FOR COMMUNICATION, TRACKING, AND RANGING USING AN OPTICAL LINK

BACKGROUND

Wireless transmission of data provides many benefits. Wireless transmission using optical wavelengths such as infrared, visible light, and so forth, facilitates high data rates and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
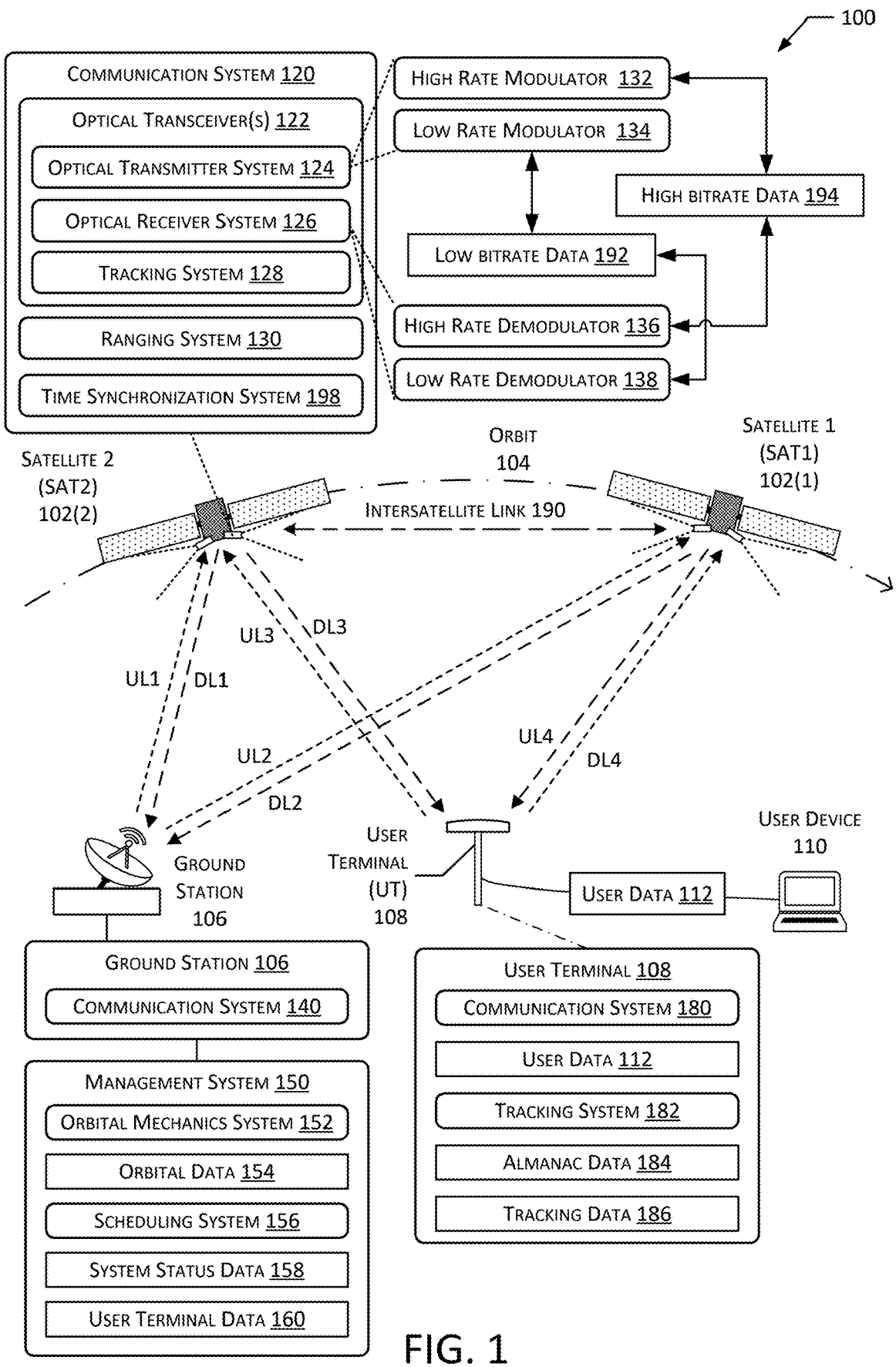
FIG. 1 illustrates a system using ground stations and a constellation of satellites, each with a communication system that provides an intersatellite link comprising a high bitrate channel having a narrow field of view and low bitrate channel having a wide field of view, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bitrates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link between a first satellite and a second satellite, allowing data to be sent from the first satellite to another. In another example, a ground station may communicate with a satellite using an optical transceiver. In still another example, fixed terrestrial stations may communicate with one another using optical transceivers.

As with any system using electromagnetic signals, including optical wavelengths, the received signal must be received with a sufficient signal to noise ratio (SNR) to facilitate the desired communication. As the bitrates increase, the SNR requirements increase as well. For example, a communication channel having a high bitrate will have greater SNR requirements than a low bitrate communication channel. By analogy, a person speaking rapidly (analogous to a high bitrate) is more easily understood in a quiet room than in a noisy hall, while the person speaking slowly (analogous to a low bitrate) may still be understood in the noisy hall.

To maintain an SNR that allows usable communication over a free space optical communication system, various techniques may be used. At the transmitter, one or more of the transmit power or gain may be increased. An example of increasing the transmit power may involve increasing the brightness of an omnidirectional light source. An example of increasing the gain may be to use reflectors and lenses to direct the light towards a receiver, or to use a directional light source such as a laser that produces a tightly collimated beam of light that is directed towards the receiver.

To provide a needed SNR, especially at high bitrates, at the receiver a more sensitive detector may be used, gain may be increased, or both. For example, gain may be increased by using a telescope to acquire incoming light obtained from a relatively large lens and focus that light down to a relatively small detector. Continuing the example, incoming light from the telescope may be coupled to a single mode optical fiber for delivery to a detector. As a result, the high bitrate communication exhibits a narrow field of view.

Given this narrow field of view, to maintain communication, it is necessary for the transmitter and the receiver to be pointed at one another and maintain that pointing while communication is in progress. The transmitter is positioned so that the light from the transmitter is directed towards the receiver. Likewise, the receiver is positioned so that the light from the transmitter is received. For example, the light source that is transmitting needs to radiate light in the direction of the receiver, and the receiver needs to gather that light and process it with a detector.

During operation of a free space optical communication system, it may be necessary to keep the beam from the transmitter precisely pointed towards the receiver, and likewise keep the receiver precisely pointed towards the transmitter. For example, the beam of incoming light may need to remain on the optical fiber that directs that light to the detector in the receiver. The characteristics that make optical wavelengths useful for data transfer also introduce engineering complications. In particular, the narrowness of the beam of incoming light requires careful pointing of the receiver system to keep that incoming light on the detector of the receiver.

In the ideal situation in which the transmitter and the receiver are not in motion and neither is subject to any sort of vibration, careful pointing could be done once and never repeated. However, all structures have some mechanical motion or vibration. A tower may sway in the wind, temperature changes cause materials to contract or expand, a motor elsewhere in the device causes some vibration during operation, and so forth. These motions can result in a failure of the receiver to remain properly pointed at the transmitter. Likewise, these motions can result in failure of the beam from the transmitter to remain properly pointed at the receiver. A device that is in motion and using optical communication, such as a satellite in orbit, introduces further complications.

To account for these motions, some form of active adjustment or feedback may be used. While the following descriptions are given with respect to an optical receiver, similar systems and techniques may be used with an optical transmitter.

The active adjustment may include an optical detector system comprising a detector array that provides output about how far a beam of incoming light deviates from a specified reference. The output signal(s) from the optical detector system may then be used to operate actuators affixed to a moveable mirror or other optical element. A feedback loop attempts to keep the incoming light aligned to a particular predetermined point, such as an optical fiber or center of a detector array, by using the output to operate the actuators. For example, the detector array may comprise four photodetectors arranged into a two-by-two detector array, also known as a "quad cell". As light impinges on each of the photodetectors, an output signal is generated by the individual photodetector. The photodetectors allow for high sensitivity and high sample acquisition rates during operation.

This process of active adjustment may be generally referred to as "tracking". Various factors can complicate the tracking process. For example, light from other sources such as reflected sunlight, starlight, and so forth may be collected by the telescope and provided to the optical detector system. The beam of incoming light is also likely to exhibit some variation in intensity due to modulation at the optical transmitter, gasses or other material along the path travelled by the beam, and so forth. As mentioned above, the tracking process may be ongoing, due to ongoing motions of one or more of the optical transmitter or the optical receiver. For example, two satellites in low Earth orbit (LEO) are constantly in motion, requiring continuous adjustment to maintain optical communication between the two.

At the receiver, the beam of incoming light is split with a first portion being sent to the optical detector system to facilitate ongoing tracking, ranging, low bitrate data, and so forth while a second portion is sent to an optical receiver system to recover the high bitrate data.

At the optical transmitter the light is modulated using a high bitrate signal and a plurality of tones. One or more of these tones may be used as tracking tones that allow the optical receiver to track the intended source and avoid tracking unintended light sources. Additionally, the tracking tones provide known signals for electronics in the tracking system to detect and use to operate the actuators to move the moveable mirror or other optical element. Improvements to an optical signal to noise ratio (SNR) of the tracking tones at the detector array results in improved noise equivalent angle (NEA). The NEA is representative of a pointing error present in an optical detector system. For example, an NEA of 1 microradians indicates that the system exhibits a pointing error of 1 microradian at any given instant. The NEA may be determined based on the optical SNR. As SNR increases, the NEA decreases. The more precisely the beam of incoming light needs to be aligned to the detector of the receiver, the lower the NEA needs to be for the system to function.

The detector array, such as a quad cell, exhibits a relatively wide field of view during operation compared to the relatively narrow field of view of the high bitrate detector(s) of the optical receiver system. This wider field of view facilitates acquisition and subsequent tracking. An output signal from the detector array is processed to recover the plurality of mutually orthogonal tones, such as tracking tones, ranging tones, and tones used to send low bitrate data. Because of the relatively wide field of view, low bitrate communication may be established before tracking is established and high bitrate communication is available. In some implementations, the low bitrate communication may be used to send link management data. For example, the link management data may comprise information about frequencies, modulation, coding, relative motion, signal strength, doppler shift, and so forth. The receiving satellite may use this information to establish and maintain tracking, to coordinate changes in modulation or coding, and so forth.

The tones may be used to determine range between the optical transceivers. For example, a first satellite may send a first timing tone comprising a phase inversion or a tone burst may be sent at a first time. A second satellite may receive and detect the timing tone, and responsive to this sends a second timing tone to the first satellite. The first satellite may receive the second timing tone at a second time. Given a known turnaround time for the second satellite to respond, a round-trip time may be calculated. Given the known velocity of light and the round-trip time, a range may be calculated.

The timing tones may also be used to provide precision time synchronization between the satellites. This may allow the constellation to support various functions such as positioning, navigation, and timing information to satellites, user terminals, and other devices.

One or more of the set of tones may be used to send relatively low bitrate data between satellites. For example, a single tone may be modulated using on-off keying (OOK) of tone bursts to encode data or a pair of tones may be modulated using frequency shift keying (FSK) of tone bursts to encode data. Characteristics of the tones such as the duration of tone bursts, frequency of the tones, modulation index, modulation technique, and so forth are selected to minimize adverse effects on other tones or the high bitrate signal. By using the techniques described in this disclosure, tones for tracking, tones for ranging, tones for time synchronization, and tones for low bitrate communication may be utilized, meanwhile the high bitrate channel is not substantially affected.

By using the techniques and systems described in this disclosure, overall operation of an optical intersatellite link is substantially improved. Acquisition and tracking times are reduced, the low bitrate channel with corresponding wider field of view facilitates link establishment and maintenance, and the high bitrate channel experiences little or no adverse impacts.

The system may be used in a variety of applications including, but not limited to intersatellite communications, communications between a satellite and ground station, communications between a satellite and user terminals, between vehicles, between terrestrial stations, and so forth. For example, the system may be used in terrestrial applications, mobile applications, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UT) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low Earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. The communication system 120 may include one or more optical transceivers 122. The optical transceiver 122 uses optical wavelengths such as infrared light, visible light, ultraviolet light, and so forth for communication. The optical transceiver 122 comprises an optical transmitter system 124 and an optical receiver system 126.

The optical transmitter system 124 includes one or more modulators. In the implementation depicted here, the optical transmitter system 124 comprises a high rate modulator 132 and a low rate modulator 134. High bitrate data 194 may be transmitted using the high rate modulator 132 to modulate emitted light. In one implementation, the high bitrate data 194 may be provided as input to a first signal source that generates as output a high bitrate signal. The high bitrate signal may be used to operate the high rate modulator 132 to modulate the emitted light.

Low bitrate data 192 may be transmitted using the low rate modulator 134. For example, the modulated light emitted by the high rate modulator 132 may be in turn modulated by the low rate modulator 134. In one implementation, the low bitrate data 192 may be provided as input to a second signal source that generates as output a low bitrate signal. The low bitrate signal may be used to operate the low rate modulator 134 to modulate the emitted light.

In other implementations, other configurations may be used. For example, a single modulator may be used to modulate the emitted light based on the high bitrate data 194 and the low bitrate data 192.

The optical transceiver 122 may include an optical receiver system 126 and a tracking system 128. The tracking system 128 provides information about a relative alignment of incoming light. This information may then be used to adjust actuators that direct the incoming light into a desired alignment. For example, the tracking system 128 may determine a distance and direction, relative to a center of a detector array of the optical transceiver 122, of the incoming light transmitted by an optical transmitter system 124(2) from the second satellite 102(2). One or more actuators may be operated responsive to this information to center the incoming light.

The tracking system 128 may use output from a detector array 392. The detector array 392 may comprise a plurality of photodetectors or photosensitive elements that generate output signals responsive to incident light. For example, the detector array 392 may comprise a quad cell photodetector. These output signals may be part of a feedback loop that attempts to track the incoming light and maintain a desired alignment of the incoming light. For example, tracking keeps a beam of incoming light centered on an optical fiber that directs the incoming light to a photodetector that is then used to detect changes in the incoming light that is used to send data. Output from the detector array 392 may be provided to the low rate demodulator 138 to determine tracking tones 382, timing tones 384, ranging tones, tones that have been modulated to send low bitrate data 192, and so forth. In comparison, the output from the photodetector of the optical receiver system 126 may be provided to the high rate demodulator 136 to determine the high bitrate data 194. Operation of the tracking system 128 is discussed in more detail in the following description.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more optical transceivers 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, conjunction mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service.

Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of a communication system 120 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise ephemeris or orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106.

The satellites 102 may also be in communication with one another. For example, the optical transceivers 122 may be used to provide an intersatellite link 190 that provides for communication between satellites 102 in the constellation. The intersatellite link 190 may provide communication between satellites 102 at the same orbital altitude, at other orbital altitudes, and so forth. In some implementations, the uplink(s) and downlink(s) may use radio wavelengths while the intersatellite link(s) 190 use optical wavelengths. In other implementations, one or more of uplink(s) or downlink(s) may use optical transceivers 122.

The intersatellite link 190 allows the satellites 102 to transfer data between one another. This data may include tracking, telemetry, and control data. For example, satellite 102(2) may be out of range of a ground station 106 and sends telemetry data using the intersatellite link 190 to satellite 102(1). Satellite 102(1) then relays the telemetry data to the ground station 106 that in turn sends the telemetry data to the management system 150. The intersatellite link 190 may also be used to send user data 112 at a high bitrate using the high rate modulator 132 and receive user data 112 at a high bitrate using the high rate demodulator 136. For example, if ground station 106(1) is unavailable to handle downlink traffic from satellite 102(1), then satellite 102(1) may use the intersatellite link 190 to send the user data 112 to satellite 102(2) that is in communication with ground station 106(2). In another example, user data 112 from a first UT 108(1) that is addressed to a second UT 108(2) may be sent from the first satellite 102(1) to the satellite 102(X) that is providing service to the second UT 108(2) using the intersatellite link 190.

The satellites 102 within the constellation have different orbital parameters. This results in a variety of possible relative motions between satellites 102 in the constellation. For example, if the satellite 102(1) is in an equatorial orbit at a first altitude and satellite 102(2005) is in a polar orbit at a second altitude, they may only be within communication range of one another for a few minutes. Due to the different relative positions of those satellites 102 with respect to Earth at any given time, satellites 102 in the constellation are affected in various ways. For example, satellite 102(2) may experience a slight increase in altitude from a predicted position due to a slight variation in Earth's gravitational field. In another example, a satellite 102 that is in sunlight will experience light pressure causing some slight movement from a predicted position. Additionally, thermal effects such as expansion and contraction, operation of actuators, and so forth introduce vibration into the structure of the satellite 102.

The optical transceivers 122 have a field of view. For example, the field of view (FOV) may be determined based on the focal length of an optical system such as a telescope. In one implementation, the FOV describes a solid angle within which incoming light will be acquired and directed to various parts of the optical transceiver 122. A wide FOV may comprise a first solid angle within which incoming light will be acquired and directed to the detector array 392 within the optical receiver system 126. Output from the detector array 392 may be provided to the low rate demodulator 138. A narrow FOV may comprise a second solid angle, smaller than the first solid angle, within which incoming light will be acquired and directed toward a photodetector within the optical receiver system 126 that is coupled to the high rate demodulator 136.

For low bitrate communication to take place, a first beam of light sent by an optical transmitter system 124(2) of the second satellite 102(2) must be within the wide FOV of the optical transceiver 122(1) of the first satellite 102(1). For bidirectional communication between the satellites 102, the converse must also be true. Continuing the example, a second beam of light sent by an optical transmitter system 124(1) of the first satellite 102(1) must be within a wide FOV of the optical transceiver 122(2) of the second satellite 102(2).

For high bitrate communication to take place, the first beam of light sent by an optical transmitter system 124(2) of the second satellite 102(2) must be within the narrow FOV of the optical transceiver 122(1) of the first satellite 102(1). For bidirectional communication between the satellites 102, the converse must also be true. Continuing the example, the second beam of light sent by the optical transmitter system 124(1) of the first satellite 102(1) must be within a narrow FOV of the optical transceiver 122(2) of the second satellite 102(2).

Given the difference in the solid angles of the wide and narrow FOV, low bitrate communication may be established before high bitrate communication.

Because of the dynamic motion of the satellites 102, variances between predicted positions compared to actual positions, vibration, and other factors, it is advantageous to track incoming light to maintain communication. The tracking system 128 facilitates this tracking by providing information as to a relative location of incoming light with respect to one or more detector arrays 392. Each detector array 392 may comprise a plurality of photodetectors. Output from the tracking system 128 may then be used to provide for active tracking. For example, output from the tracking system 128 may be used to adjust a moveable mirror in the optical transceiver 122 to maintain the incoming light in a desired alignment. Continuing the example, the desired alignment may place a spot of the incoming light onto an optical fiber that provides the incoming light to a detector of the optical receiver system 126, such as a photodetector having its output connected to the high rate demodulator 136. In some implementations, the optical transmitter system 124 may utilize a portion of the same optical path. For example, outgoing light from the optical transmitter system 124 may also impinge on the moveable mirror and thus is directed towards optics of the remote optical transceiver 122.

In some implementations, to facilitate operation, the tracking system 128 or another system may utilize one or more optical components to provide a beam shape on the detector array 392 that is not circular in cross section. This non-spot beam shape provides for an improved slope factor (SF) during operation, substantially reducing the noise equivalent angle (NEA) of the tracking system 128.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
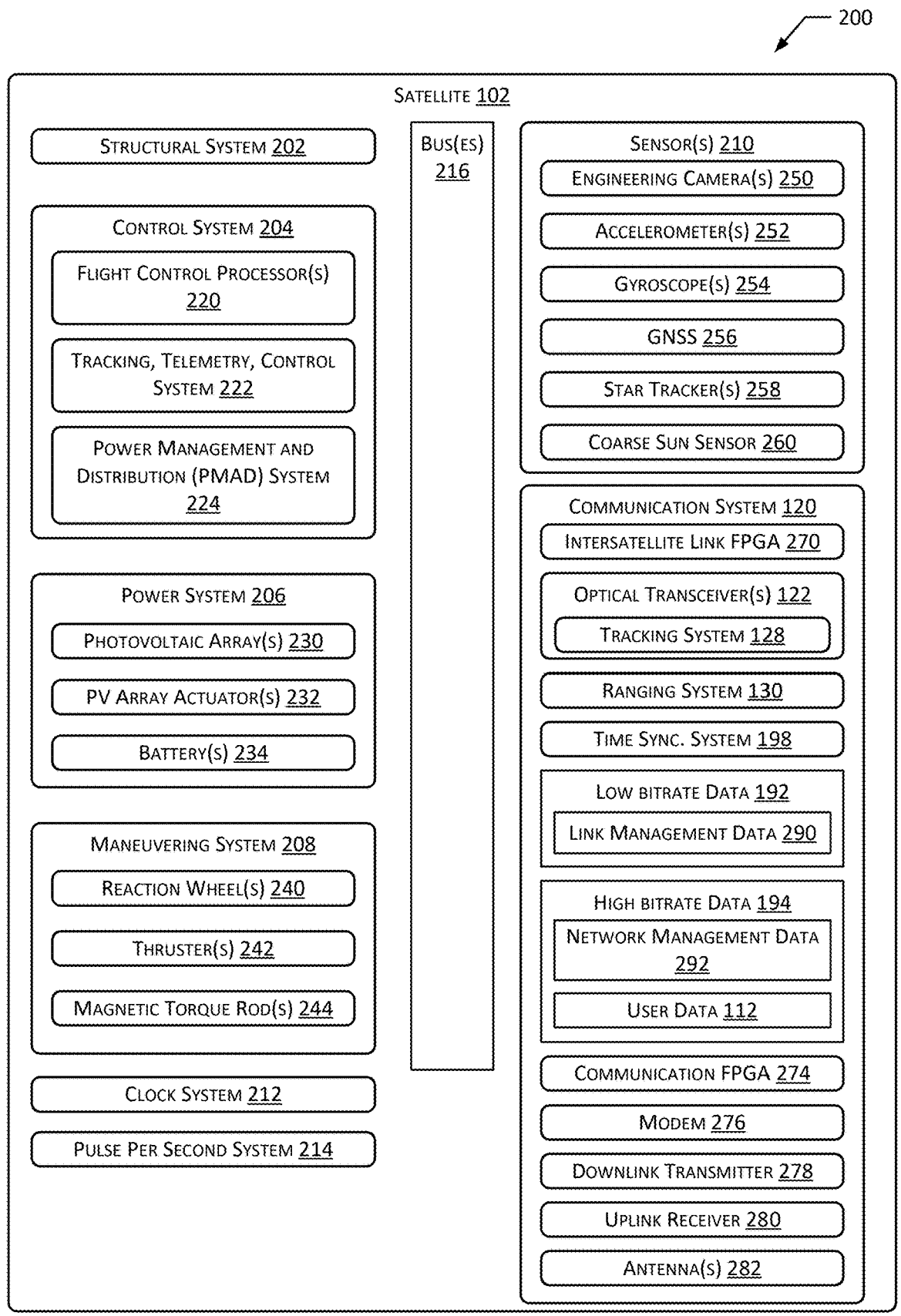
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 120.

A clock system 212 may comprise one or more devices that provide precision time data. For example, the clock system 212 may comprise one or more local high precision clocks. For example, the local clock may comprise one or more of an atomic clock, quantum clock, optical lattice clock, and so forth. The clock system 212 may maintain synchronization with an external reference. For example, the clock system 212 may maintain synchronization with true time originating from one or more stratum 0 reference clocks, such as maintained by a country or standards organization. For example, the clock system 212 may be ultimately synchronized to global positioning system (GPS) time as provided by the Global Positioning System, UTC from the National Institute of Standards and Technology (NIST), and so forth.

The clock system 212 may operate in conjunction with the time synchronization system 198 and other systems to maintain time synchronization with an external reference. The time synchronization system 198 may serve as a time reference to another device, or utilize another device as a time reference, or both. The time synchronization system 198 may use timing tones to provide precise time information. For example, the time synchronization system 198 may receive time data from the clock system 212 and send timing tones to provide precision time information to the receiving satellite 102. In another example, the time synchronization system 198 may receive timing tones indicative of precision time information and use those timing tones to determine a correction value or offset value associated with the local clock(s) of the clock system 212.

In some implementations the clock system 212 may be used to provide position, navigation, or timing (PNT) services. For example, the clock system 212 may provide time data that is then used by the communication system 120 to transmit a pseudorandom code and time of transmission messages, ephemeris or almanac data 184 about the satellite 102, and so forth. Based on this information from one or more satellites 102, a UT 108 may determine its position, provide navigation functions, derive time data associated with the reference clocks, and so forth.

In some implementations output from the clock system 212 may be used to operate the communication system 120 or other systems. For example, the clock system 212 may provide time information to a pulse per second (PPS) system 214. The PPS 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations, the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more photovoltaic (PV) array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems 276, digital signal processors, power amplifiers, antennas 282 (including at least one antenna that implements multiple antenna elements, such as a phased array antenna), lasers, telescopes, photodetectors, processors, memories, storage devices, communications peripherals, interface buses, and so forth. Such components support communications with other satellites 102, ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an optical transceiver 122 to send data between satellites 102. The optical transceiver 122 may operate using optical wavelengths. The optical transceiver 122 may include the tracking system 128. In one implementation, the optical transceiver 122 is discussed more with regard to FIG. 3.

The communication system 120 may include the ranging system 130. The ranging system 130 may use the optical transceiver 122 to determine range data between satellites 102. For example, the ranging system 130 may send a first timing tone and receive a second timing tone in response. Based on a difference between a first time the first timing tone was sent, a second time the second timing tone was received, and a known turnaround time, a round-trip time may be calculated. Based on the round-trip time and the known velocity of light, the range may be calculated.

The communication system 120 may use the optical transceivers 122 to send, receive, or send and receive low bitrate data 192. The low bitrate data 192 may comprise link management data 290. The link management data 290 may comprise information about frequencies, modulation, coding, relative motion, signal strength, doppler shift, and so forth. The link management data 290 may be used by a receiving device to establish and maintain tracking, to coordinate changes in modulation or coding, and so forth.

The communication system 120 may use the optical transceivers 122 to send, receive, or send and receive high bitrate data 194. The high bitrate data 194 may comprise one or more of network management data 292, user data 112, and so forth. The network management data 292 may comprise information associated with operation of the network, such as handover data to facilitate transfers of service, provisioning of UTs 108 from one satellite 102 to another, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
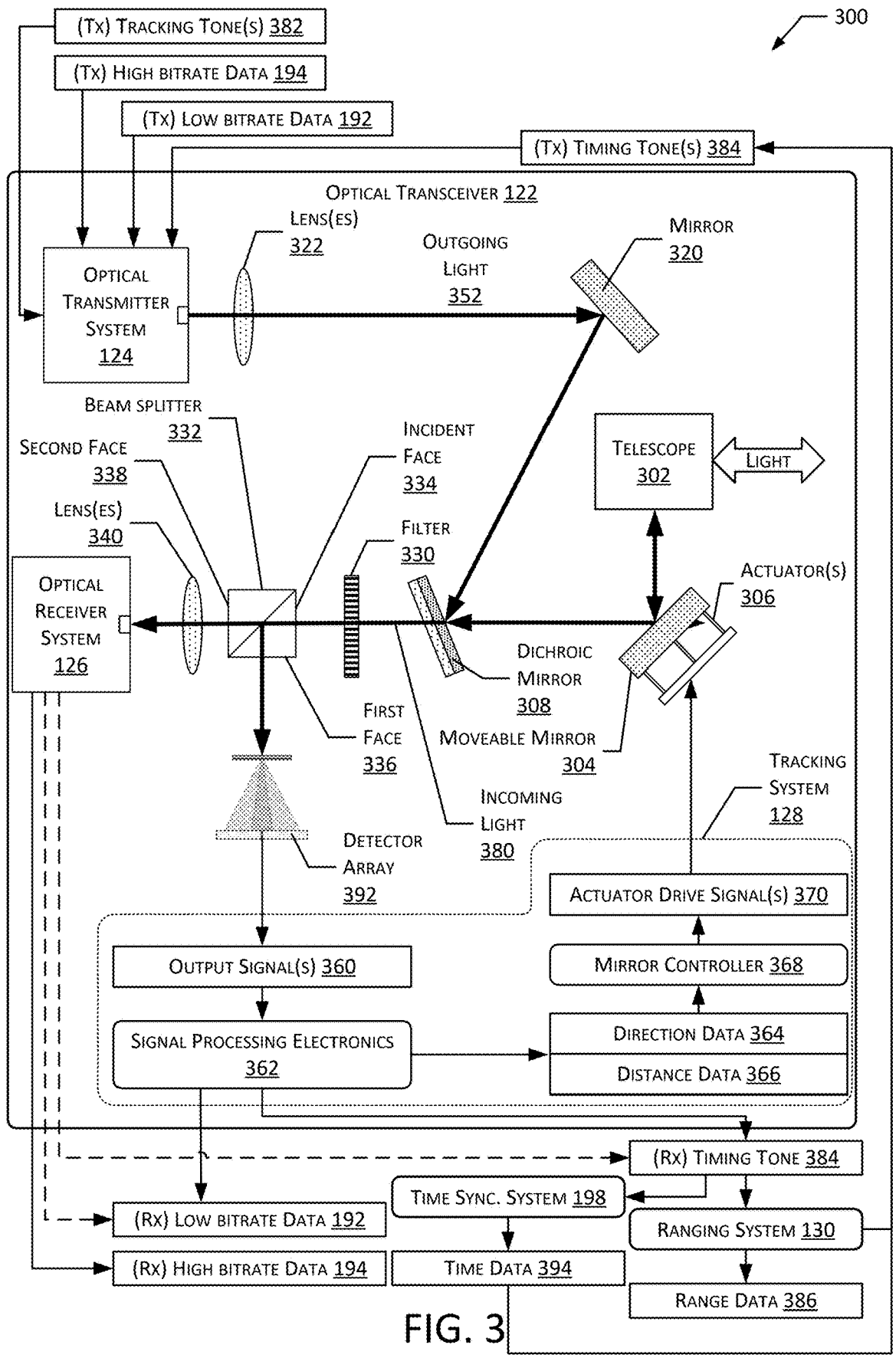
FIG. 3 is a block diagram of the optical transceiver, according to some implementations.

FIG. 3 is a block diagram 300 of the optical transceiver 122, according to some implementations. A telescope 302 or other arrangement of optical elements sharing a common aperture may be used to acquire incoming light 380 and direct outgoing light 352. For example, the telescope 302 may comprise one or more lenses, mirrors, or other optical components. An optical path of the optical transceiver 122 may include one or more moveable mirrors 304 with one or more associated actuators 306. During operation, the one or more moveable mirrors 304 may change a path of one or more of the incoming light 380 or the outgoing light 352. In some implementations the moveable mirror 304 and the actuator 306 may comprise a microelectromechanical system. In some implementations the actuators 306 may comprise motors, piezoelectric devices, voice coils, and so forth. For example, a fast steering mirror (FSM) comprising a mirror that is moved based on activation of a voice coil may be used as the moveable mirror 304 and the actuator 306.

A dichroic mirror 308 may be used to selectively direct particular wavelengths of light between the optical transmitter system 124 and the optical receiver system 126. For example, the dichroic mirror 308 may pass incoming light 380 with a first wavelength to the optical receiver system 126 while reflecting outgoing light 352 with a second wavelength.

The optical transmitter system 124 may comprise a light source, such as a light emitting diode, quantum dot, laser, and so forth.

The optical transmitter system 124 also includes one or more devices to modulate and amplify light from the light source to produce outgoing light 352. The optical transmitter system 124 may comprise the high rate modulator 132 and the low rate modulator 134. In one implementation, the high rate modulator 132 may comprise birefringent electro-optical devices to produce phase modulation. In some implementations, the high rate modulator 132 may comprise a plurality of modulators. The optical transmitter system 124 may include one or more signal sources. For example, the signal sources may comprise digital to analog converters, signal generators, oscillators, or other devices. The optical transmitter system 124 accepts data for transmission during operation.

The optical transmitter system 124 may emit amplified using one or more amplifiers. Amplifiers may comprise one or more doped fiber amplifiers (DFA). For example, the amplifier may comprise an erbium-doped fiber amplifier (EDFA).

The outgoing light 352 may pass through one or more lenses 322, mirrors 320, and so forth. The outgoing light 352 may be incident to the dichroic mirror 308 and then subsequently is reflected to the moveable mirror 304. The moveable mirror 304 reflects the outgoing light 352 into the telescope 302. The telescope 302 directs the outgoing light 352 towards the receiving optical transceiver 122, such as in another satellite 102, at a ground station 106, and so forth.

The incoming light 380 is directed by the dichroic mirror 308 towards the optical receiver system 126. In some implementations a filter 330 may be in the optical path. The filter 330 may be used to remove unwanted or undesirable wavelengths of light. The incoming light 380 may pass through a beam splitter 332. In this illustration, the beam splitter 332 is depicted as a cubical beam splitter comprising two triangular prisms. In other implementations other beam splitter designs may be used, such as a half-silvered mirror.

In one implementation, the beam splitter 332 may have an incident face 334, a first face 336, and a second face 338. For example, the beam splitter 332 may comprise a cubical beam splitter. The incident face 334 is a portion of the beam splitter 332 upon which the incoming light 380 impinges. The first face 336 comprises a portion of the beam splitter 332 from which a first portion of the incoming light 380 is emitted. For example, the first face 336 may comprise the face from which a reflection of the incoming light 380 is directed. The second face 338 comprises a portion of the beam splitter 332 from which a second portion of the incoming light 380 is emitted. For example, the second face 338 may comprise the face from which the incoming light 380 is transmitted or not otherwise reflected and may be directed towards the optical receiver system 126.

The incoming light 380 emitted from the first face 336 passes to the detector array 392. The detector array 392 may comprise a plurality of photodetectors or photosensitive elements that generate output signals 360 responsive to incident light. For example, the detector array 392 may comprise a quad cell photodetector.

The detector array 392 provides as output one or more output signals 360 representative of the plurality of orthogonal tones that were used to modulate the light at the transmitter.

The detector array 392 comprises a plurality of photodetectors. Each photodetector may provide an output signal 360 having a current that is representative of the power of incident light incident on that photodetector. The photodetectors may comprise photomultiplier tubes (PMT), silicon photomultipliers, avalanche photodiodes, and so forth. In one implementation, the detector array 392 may comprise four photodetectors (1)-(4) arranged in a two-by-two array. For example, the detector array 392 may comprise four indium gallium arsenide (InGaAs) photodiodes in a common package, such as the G6849 series from Hamamatsu Photonics K.K. of Japan. In other implementations the detector array 392 may use other arrangements of a plurality of photodetectors. For example, if tracking with respect to a single axis is needed, two or more photodetectors may be arranged in a line. In another example, the detector array 392 may comprise an eight-by-eight array of 64 photodetectors. In still another example, the detector array 392 may comprise an imaging device such as a charge coupled device (CCD), complementary metal oxide semiconductor (CMOS) imager, and so forth.

The photodetectors provide as output a signal that is indicative of light incident upon their active area. For example, light incident on an active portion of a photodetector may produce an output signal 360 comprising an output current that is proportionate to power of the incident light. Individual photodetectors may be separated from one another by a gap. For example, the gap may be 30 micrometers.

In some implementations, the detector array 392 may be operated in conjunction with one or more optical elements. In some implementations, at least a portion of the optical elements may reshape the beam of incoming light 380 into a non-spot beam shape. To provide for beam reshaping, the optical elements may include one or more lenses such as a cylindrical lens or other elements comprising a plurality of diffractive features. Non-spot beam shapes may include, but are not limited to, rectangles, crosses, and so forth. For example, a pair of photodetector arrays 392(1) and 392(2) may be used. Each may have a non-spot beam shape impinging thereon of rectangles, the rectangles being perpendicular to each other.

The output signals 360 may be processed by signal processing electronics 362. The signal processing electronics 362 may accept the analog signals from the photodetectors as input and provide as output digital data. For example, the signal processing electronics 362 may comprise one or more of an ammeter, transimpedance amplifier, analog to digital converter (ADC), and so forth. In some implementations the signal processing electronics 362 may include one or more processors. These processors may perform one or more functions, including but not limited to denoising, averaging, and so forth.

The signal processing electronics 362 may determine one or more of a plurality of tones that are represented by the output signal 360. In one implementation, the signal processing electronics 362 may utilize one or more digital signal processors (DSP) implementing a plurality of instantiations of Geortzel algorithms, each instantiation extracting a particular tone of the plurality of tones, if present. In another implementation the signal processing electronics 362 may implement one or more lock-in amplifiers to extract the tones of the plurality of tones.

The signal processing electronics 362 may determine one or more tracking tones and, based on the one or more tracking tones, provide as output direction data 364 and distance data 366. The direction data 364 may be indicative of a direction of a center of the incoming light 380 with respect to one or more axes and relative to a predetermined point on the detector array 392. For example, the direction data 364 may be indicative of an angle. The distance data 366 may be indicative of a distance of a center of the incoming light 380 with respect to the predetermined point relative to the detector array 392. For example, the distance data 366 may be indicative of a distance in micrometers. In some implementations the direction data 364 and the distance data 366 may be combined. For example, the output from the signal processing electronics 362 may be indicative of a set of cartesian coordinates with respect to the X and Y axes of the detector array 392. A set of coordinates would thus indicate direction and distance of the first portion or spot relative to an origin of the axes, where the origin coincides with the predetermined point such as a center of the detector array 392.

The output from the signal processing electronics 362 may be provided to a mirror controller 368. For example, the mirror controller 368 may comprise a processor that accepts the direction data 364 and the distance data 366 and determines a magnitude and direction of movement of the moveable mirror 304. The mirror controller 368 may generate as output one or more actuator drive signals 370. The actuator drive signals 370 may then be used to operate the one or more actuators 306. When operated, the actuators 306 move the moveable mirror 304, changing the path of the light incident thereon.

In the implementation depicted here, the tracking system 128 may comprise the signal processing electronics 362, or a portion thereof, and the mirror controller 368. The system may thus operate in a feedback loop, with the output from the tracking system 128 comprising the actuator drive signals 370 that may be used to perform tracking. During tracking, the path of the incoming light 380 is changed by the movement of the moveable mirror 304 to maintain the desired alignment of the incoming light 380. This desired alignment may result in the light entering the optical receiver system 126. For example, by aligning the incoming light 380 with respect to the detector array 392 the incoming light 380 is also aligned with respect to the optical input of the optical receiver system 126.

The tracking system 128 may also comprise a signal generator or other signal source (not shown) that provides one or more tracking tones 382. The tracking tones 382 may be provided to the optical transmitter system 124 for transmission. For example, the low rate modulator 134 may accept the tracking tones 382 as an input, or may generate the tracking tones 382 locally, and modulate the outgoing light 352 to include the tracking tones 382.

The incoming light 380 emitted from the second face 338 may pass through one or more lenses 340 before entering the optical receiver system 126. The optical receiver system 126 may comprise one or more optical amplifiers, detectors, demodulators, and so forth. For example, the optical receiver system 126 comprises the high rate demodulator 136 that demodulates the high bitrate signal to determine the high bitrate data 194. In some implementations (indicated with a dotted line) the optical receiver system 126 may include the low rate demodulator 138 as well, and may provide as output the low bitrate data 192, timing tones 384, and so forth.

In other implementations other arrangements of the various components of the optical transceiver 122 or a portion thereof may be used. For example, a combination device that operates as a dichroic mirror 308 and beam splitter 332 may be used. In another implementation the filter 330 may be omitted. In some implementations, the optical transmitter system 124 may be omitted and the resulting system is limited to receiving data. In other implementations the optical receiver system 126 may be omitted and the resulting system is limited to transmitting data.

In other implementations, the system 100 may be used to facilitate tracking and ranging of an object. For example, instead of or in addition to transferring data, the outgoing light 352 may be used to illuminate an object, such as a satellite 102. The incoming light 380 may comprise the outgoing light 352 as reflected by the object. For example, another satellite 102 may include a retroreflector. The system may thus be used to track the object so illuminated. In some implementations, as described below, range may be determined by transmitting a timing tone 384 and detecting the reflected timing tone 384.

Other systems may utilize the optical transceiver 122. The ranging system 130 may accept as input received timing tones 384 detected by the low rate demodulator 138. The ranging system 130 may initiate or generate transmission of timing tones 384. For example, during ranging operations, the ranging system 130 may emit timing tones 384 for transmission at particular times. The ranging system 130 may accept received timing tones 384 as input. The ranging system 130 may determine a time of flight of one or more timing tones 384. Given the known velocity of light and the time of flight, the range or distance between may be calculated. In some implementations, the ranging system 130 may be configured to respond to a received timing tone 384 or other signal by transmitting a transmitted timing tone 384 after a specified predetermined interval. For example, the ranging system 130 may be configured to, responsive to a receive timing tone 384, send a transmitted timing tone 384 exactly 1 millisecond later. The ranging system 130 may operate on demand, continuously, or in various configurations to determine range data 386 indicative of the distance between optical transceivers 122. The ranging system 130 may use various techniques such as acquiring many samples of round-trip times and perform statistical analysis to determine the range data 386. The ranging system 130 may utilize information from other systems, such as ephemeris data, link management data 290, and so forth to account for sources of variation such as equipment changes, propagation variations, relativistic effects, and so forth.

The timing tone 384 may comprise a tone burst comprising an integer number of cycles. In some implementations, a phase inversion or "phase flip" may be used to indicate that a particular tone burst is a timing tone 384 or represents a specified time. For example, during a phase inversion the phase of one or more cycles of the tone is modified, such as being changed by 180 degrees. This phase inversion may be readily detected by performing a cross-correlation operation.

In some implementations the timing tone 384 may comprise an absence of an integer number of cycles. For example, the low bitrate tone used to provide timing data may be transitioned from a nonzero amplitude to a zero amplitude to represent a specified time.

The time synchronization system 198 may also utilize the optical transceiver 122 to exchange timing information with optical transceivers 122 associated with other devices, such as satellites 102 or ground stations 106. The time synchronization system 198 may accept as input received timing tones 384 detected by the low rate demodulator 138. The time synchronization system 198 may initiate or generate transmission of timing tones 384. For example, the time synchronization system 198 may emit timing tones 384 for transmission at particular times such as every 1 second. The time synchronization system 198 may accept received timing tones 384 as input. The time synchronization system 198 may determine time data 394 based on the one or more timing tones 384. The time data 394 may comprise data indicative of offset values, correction values, and so forth that may be used to modify or adjust operation of the clock system 212 or other systems such as the PPS system 214.

The time synchronization system 198 may operate on demand, continuously, or in various configurations to determine time data 394 for maintaining precision time synchronization with another device. The time synchronization system 198 may use various techniques such as acquiring many samples of timing tones 384 and their reception timestamps based on the clock system 212 and perform statistical analysis to determine the time data 394. The time synchronization system 198 may utilize information from other systems, such as ephemeris data, link management data 290, and so forth to account for sources of variation such as equipment changes, propagation variations, relativistic effects, and so forth.

Figure 4:
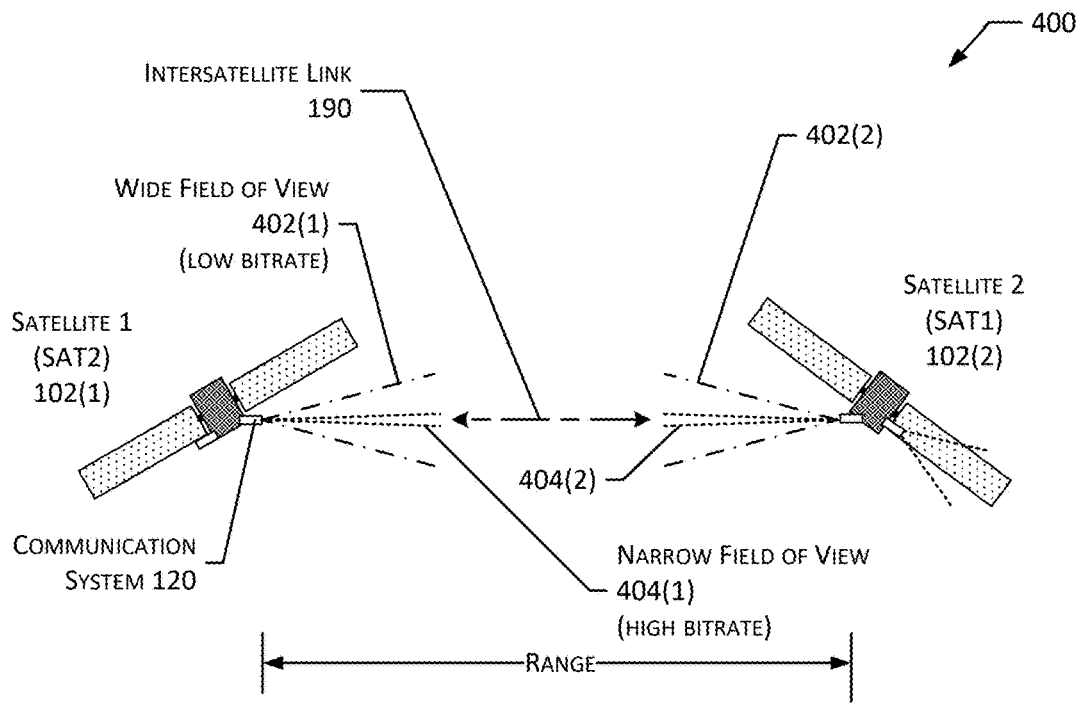
FIG. 4 illustrates the intersatellite link and the different field of view of the high and low bitrate channels, range between the satellites, and tone selection, according to some implementations.
Figure 4:
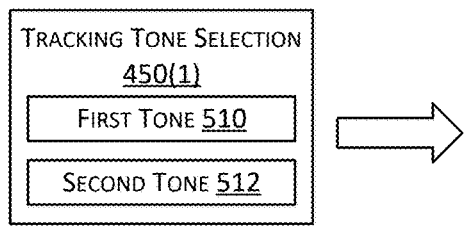
Figure 4:
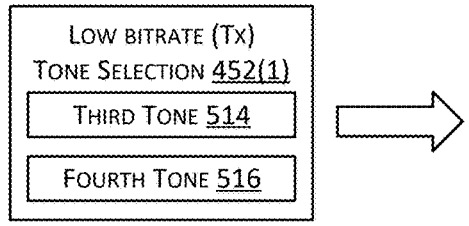

FIG. 4 illustrates at 400 the intersatellite link 190 and the different fields of view (FOV) of the high and low bitrate channels, range between the satellites 102, and tone selection, according to some implementations.

The optical transceivers 122 have a field of view (FOV). The FOV may be determined based on the focal length of an optical system such as a telescope. The FOV describes a solid angle within which incoming light will be acquired and directed to various parts of the optical transceiver 122. However, different portions of the optical transceiver 122 result in different fields of view.

A wide FOV 402 associated with a low bitrate channel may comprise a first solid angle within which incoming light will be acquired and directed to the detector array 392 within the optical receiver system 126. Output from the detector array 392 may be provided to the low rate demodulator 138 that provides as output one or more of the low bitrate data 192, the one or more of the tones, or information based thereon.

A narrow FOV 404 associated with a high bitrate channel may comprise a second solid angle, smaller than the first solid angle, within which incoming light will be acquired and directed toward a photodetector within the optical receiver system 126 that is coupled to the high rate demodulator 136. Output from the high rate demodulator 136 may comprise the high bitrate data 194.

The range may comprise a distance between participating optical communication systems 120.

As described herein, the optical transceiver 122 utilizes a plurality of tones for tracking, ranging, time synchronization, low bitrate data 192, and so forth. In the implementation described herein, four tones are used. The four tones may be mutually orthogonal, or at least substantially orthogonal, during operation. In other implementations, fewer or greater numbers of tones may be used. Four tones are described herein for ease of illustration, and not as a limitation.

Characteristics of the tones such as duration of tones and tone bursts, frequency of the tones, modulation index, modulation technique, and so forth are selected to minimize adverse effects on other tones or the high bitrate signal. In one implementation, the modulation index of the tones may be 30% or less. In another implementation the modulation index of the tones may be 10% or less. The modulation indices may differ for the different tones. For example, tracking tones 502 may have a greater modulation index than low bitrate tones 504.

As shown here, the plurality of tones may be selected for use in performing particular functions such as a tracking tone selection 450 and a low bitrate tone selection 452. The tracking tone selection 450 may comprise one or more tones that are used by the tracking system 128 to operate the actuators 306. The low bitrate tone selection 452 may comprise one or more of the timing tones 384 used by the ranging system 130, timing tones 384 used by the time synchronization system 198, tones used to send low bitrate data 192, and so forth.

In this illustration, the first satellite 102(1) utilizes a first tracking tone selection 450(1) comprising a first tone 510 and a second tone 512. In other implementations a single tone may be used, and the other tone may be used for other purposes. For example, the tracking tone selection 450(1) may consist of the first tone 510 used for tracking while the low bitrate tone selection 452(1) comprises the second tone 512. Continuing the example, the second tone 512 may be used for a timing tone 384 associated with operation of the time synchronization system 198.

The first satellite 102(1) utilizes a first low bitrate tone selection 452(1) comprising a third tone 514 and a fourth tone 516.

In other implementations, other tone configurations may be used. The tones are discussed in more detail in the following. Each tone selection may comprise one or more tones.

Figure 5:
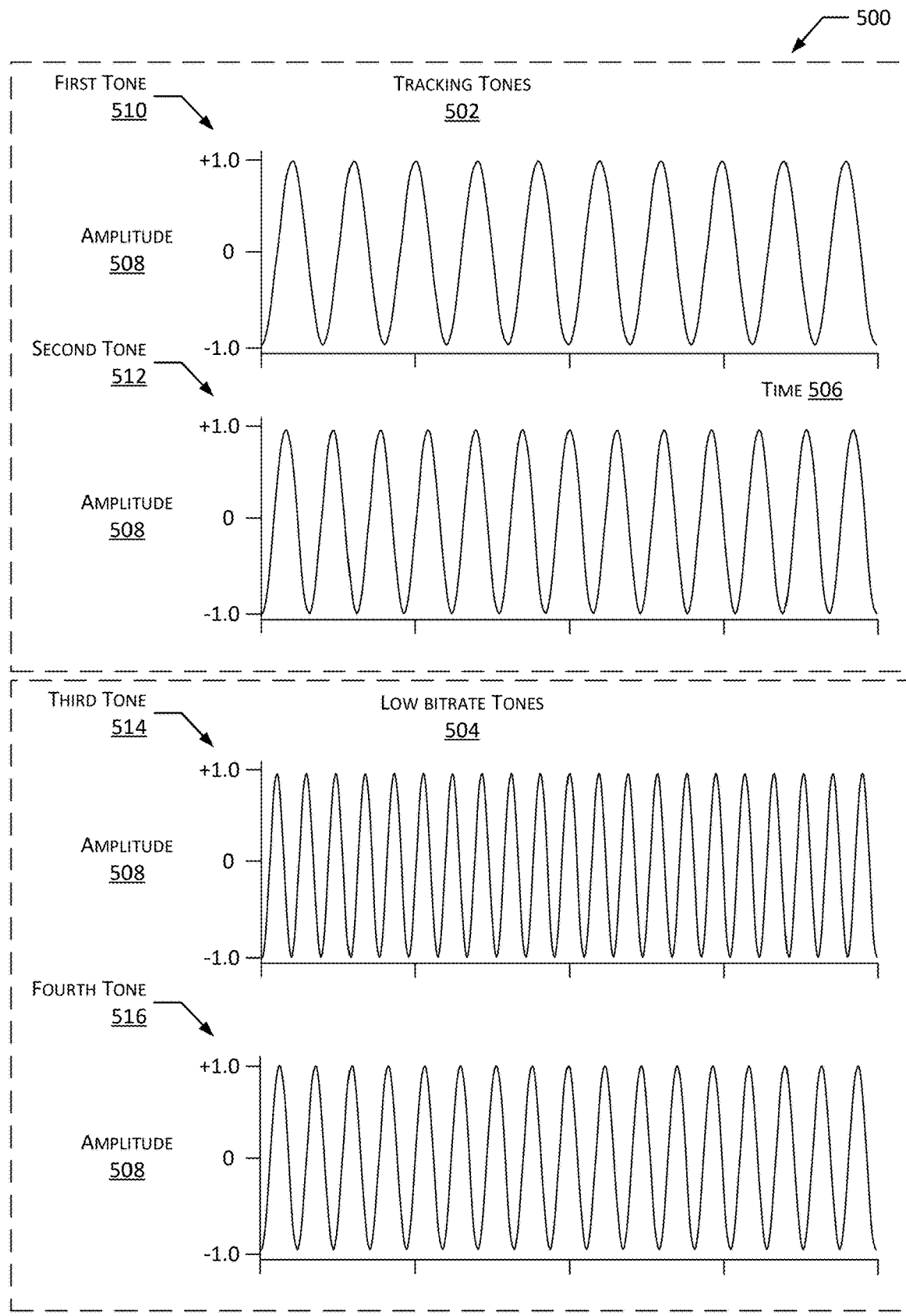
FIG. 5 illustrates individual sinusoidal waveforms of four tones, according to some implementations.

FIG. 5 illustrates at 500 individual sinusoidal waveforms of the four tones, according to some implementations. In this implementation, each tone is depicted as a graph with a horizontal axis indicative of time 506 and a vertical axis indicative of amplitude 508.

The tones are grouped into tracking tones 502 and low bitrate tones 504 for ease of discussion and not necessarily as a limitation. For example, the tracking tones 502 are depicted as comprising the first tone 510 and the second tone 512, while the low bitrate tones 504 are depicted as comprising the third tone 514 and the fourth tone 516. In other implementations, other combinations may be used. For example, the tracking tones 502 may comprise the third tone 514 and the fourth tone 516, while the low bitrate tones 504 comprise the first tone 510 and the second tone 512. In some implementations, the use of higher frequency tones as the tracking tones 502 may improve tracking performance.

As depicted, the tones may be sinusoidal. Use of sinusoidal waveforms may minimize generation of harmonic artifacts. In other implementations, other waveforms may be used.

In one implementation the frequencies of the tones may be as follows:

TABLE 1

| Tone | Frequency (kilohertz) |
|---|---|
| First tone 510 | 41.6666 |
| Second tone 512 | 62.5 |
| Third tone 514 | 83.333 |
| Fourth tone 516 | 104.1666 |

The frequencies in Table 1 may be approximate. For example, the first tone 510 may have a frequency of 41.66666 kHz.

Figure 6:
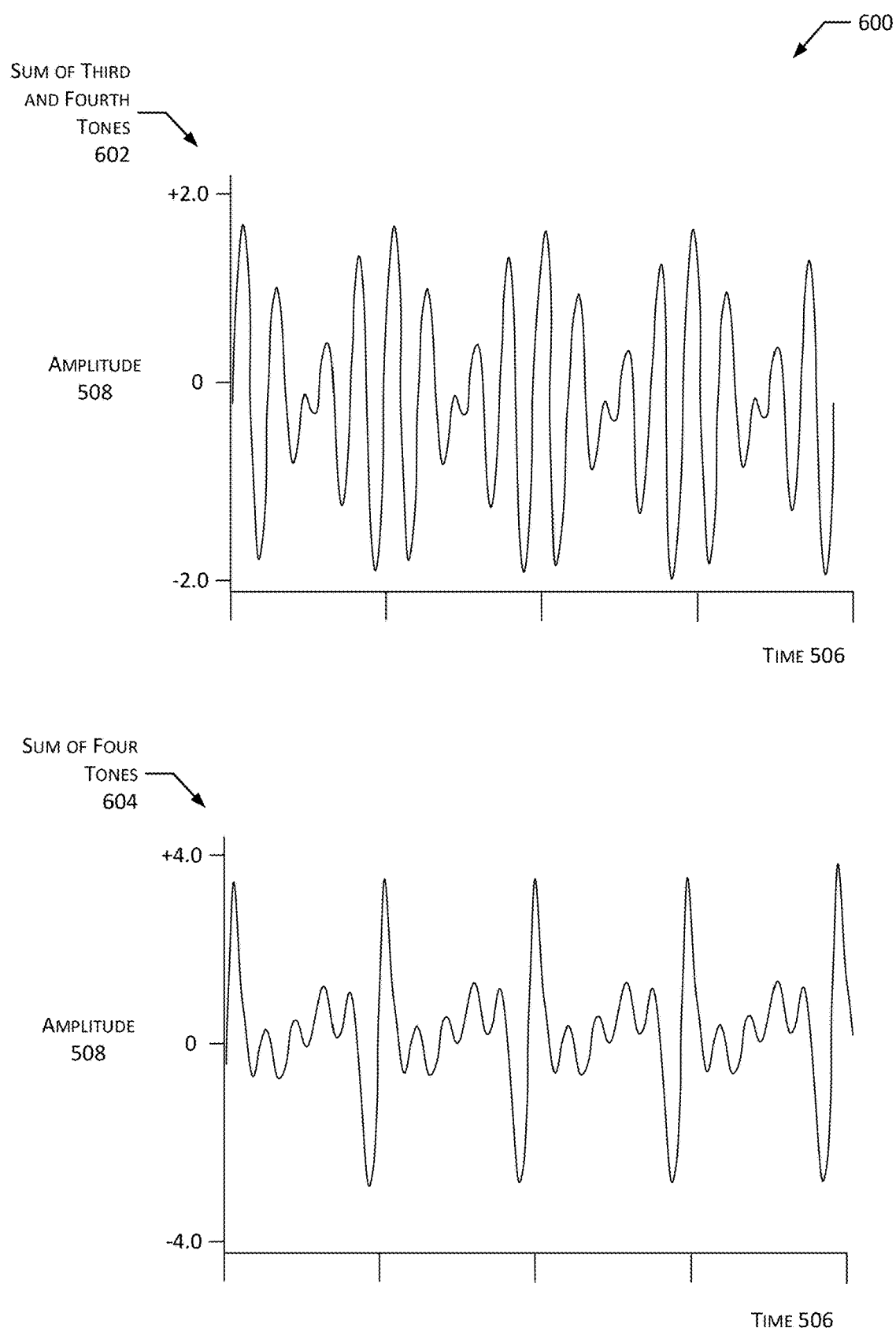
FIG. 6 illustrates graphs of waveforms including a sum of third and fourth tones and a sum of all four tones, according to some implementations.

FIG. 6 illustrates at 600 graphs of waveforms based on the four tones of FIG. 5, according to some implementations.

At 602 a sum of the third tone 514 and fourth tone 516 is shown. In this graph, continuous tones are summed. The resulting overall amplitude of the summed tones remains relatively low, less than twice that of the original tones. This provides an indication that during operation, simultaneous presence of the third tone 514 and fourth tone 516 will have minimal impact on the high bitrate signal.

At 604 a sum of all four tones is shown. In this graph, continuous tones are summed. The resulting overall amplitude of the summed tones remains relatively low, less than four times that of the original tones. This provides an indication that during operation, simultaneous presence of the tones will have minimal impact on the high bitrate signal.

Figure 7:
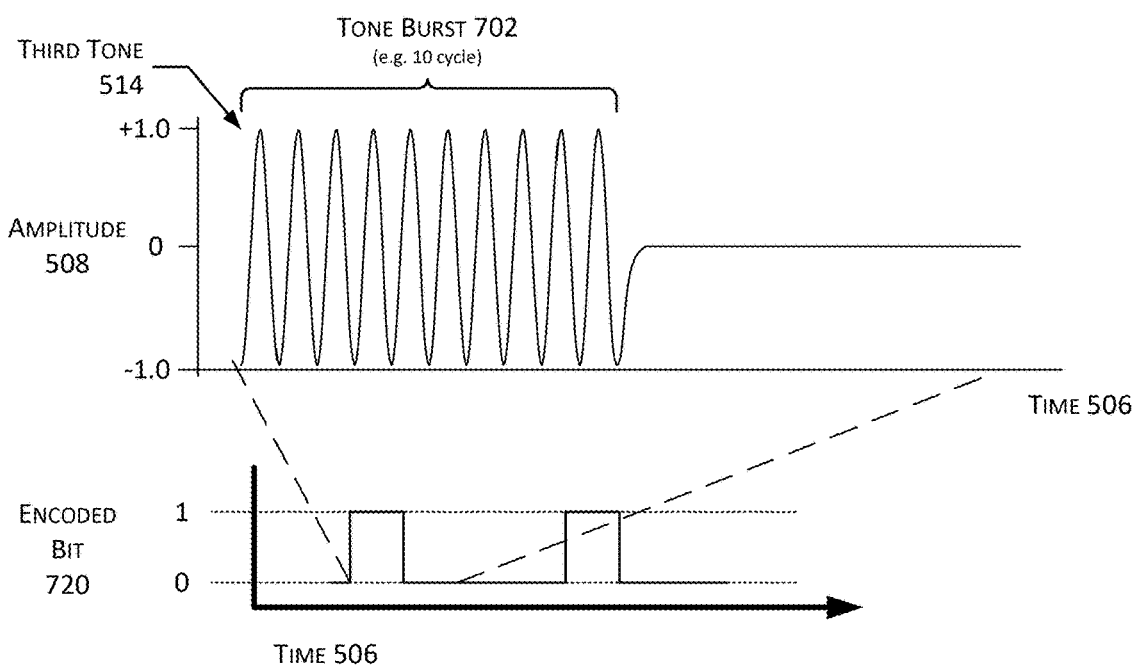
FIG. 7 illustrates on-off-keying (OOK) using a tone burst of a single tone to send low bitrate data, according to some implementations.

FIG. 7 illustrates at 700 on-off-keying (OOK) using a tone burst of a single tone to send low bitrate data 192, according to some implementations. For example, the low rate modulator 134 may implement OOK to encode data on the outgoing light 352.

In this implementation, OOK encodes data by representing a bit of data (or binary "1") by the presence of a specified tone for a particular time. In this illustration, the graph shows the third tone 514 with time 506 and amplitude 508 as described above.

A tone burst 702 is generated. The tone burst 702 comprises a predetermined duration. In some implementations the tone burst 702 may have a duration that is an integer number of cycles of the frequency of the tone. For example, the tone burst 702 may have a duration of 10 cycles of the third tone 514.

An encoded bit 720 is represented by the presence or absence of the tone burst 702 during a particular time 506. For example, during a first time 506 the presence of the tone burst 702 indicates a binary "1" while the following absence indicates a binary "0".

Figure 8:
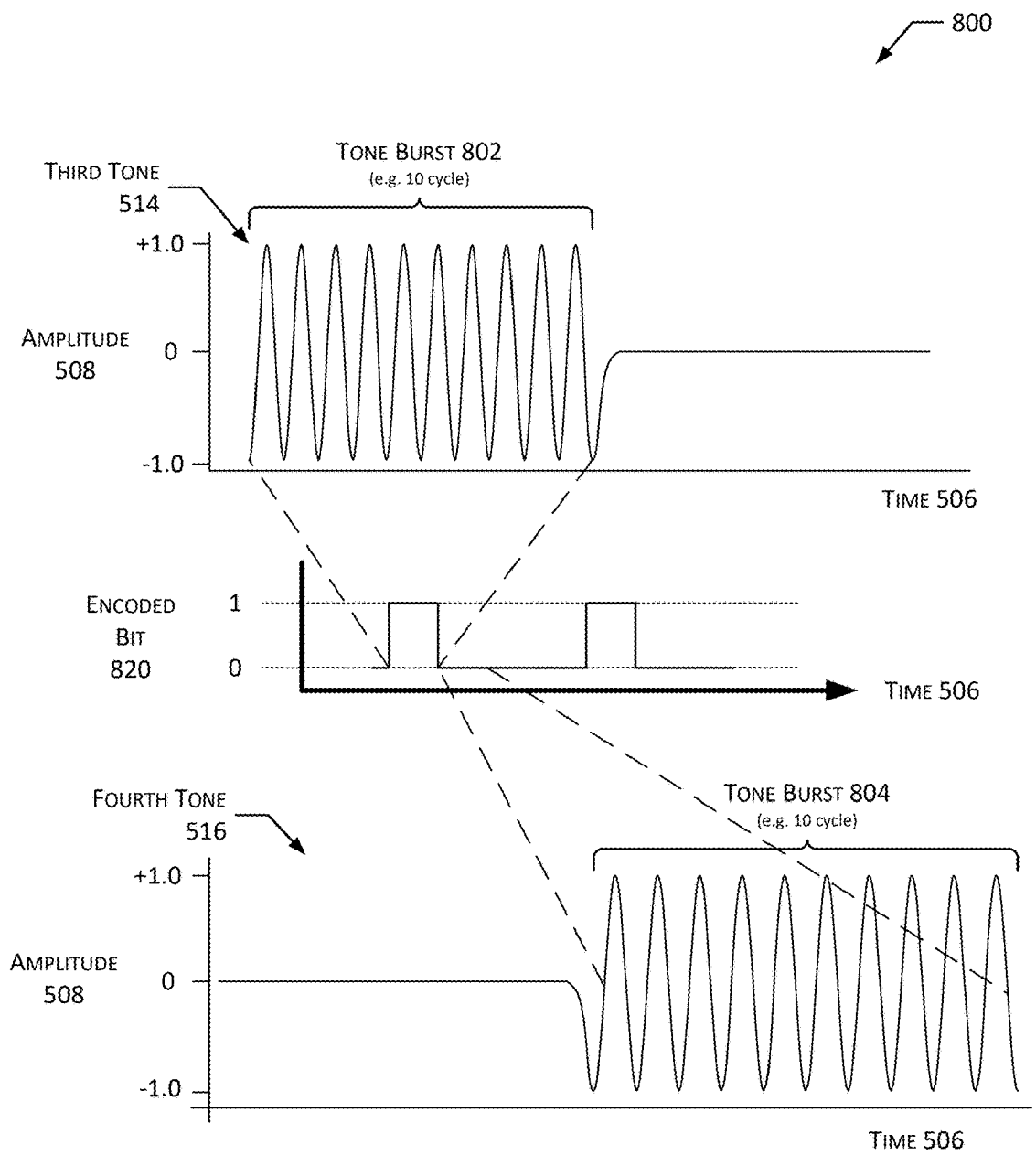
FIG. 8 illustrates frequency shift keying (FSK) using tone bursts of two tones to send low bitrate data, according to some implementations.

FIG. 8 illustrates at 800 frequency shift keying (FSK) using tone bursts of two tones to send low bitrate data 192, according to some implementations. For example, the low rate modulator 134 may implement FSK to encode data on the outgoing light 352.

In this implementation, FSK encodes data by using tone bursts in one tone to represent a binary "1" and another tone burst with a different tone to represent a binary "0". In this implementation, tone bursts 802 using the third tone 514 represent an encoded bit 820 value of "1" while tone bursts 804 using the fourth tone 516 represent the encoded bit 820 value of "0".

In some implementations one or more characteristics of the tone bursts 802 may be modified. For example, amplitude of the cycles in the tone burst 802 may be ramped up and down over some interval of time, such as expressed by a complementary error function (ERFC).

In other implementations, other modulation techniques may be used to send low bitrate data 192. For example, phase shift keying techniques may be used in which the phase of the tone is used to encode information. In one implementation a tone may be modulated using binary phase-shift keying (BPSK) to send the low bitrate data 192. In some implementations, to minimize interference, a phase shift of less than 180 degrees may be used. For example, BPSK with a phase shift of 90 degrees may be used to encode data.

Figure 9:
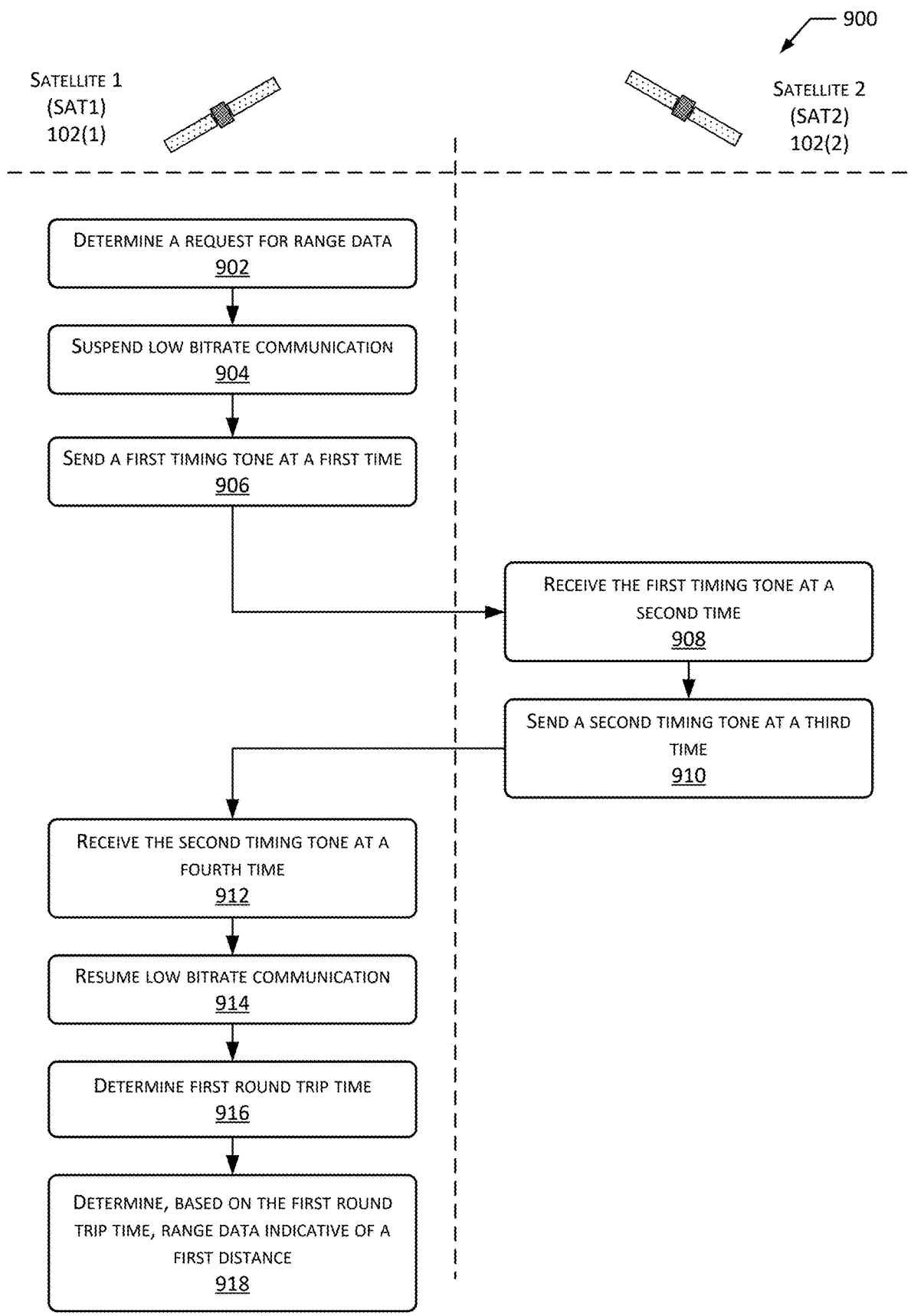
FIG. 9 is a flow diagram of a process to determine a range between satellites using one or more tones, according to some implementations.

FIG. 9 is a flow diagram 900 of a process to determine a range between satellites using one or more tones, according to some implementations. The process may be implemented at least in part by one or more of the optical transceiver 122 or the ranging system 130.

At 902 at a first satellite 102(1) a request for range data 386 is determined. For example a request for range data 386 from the control system 204.

In some implementations, at 904 low bitrate communication may be suspended during ranging operation. For example, the tracking tones 502 may be continued while the low bitrate tones 504 may be suspended. This suspension may facilitate detection of the timing tone(s) 384 at the receiving optical transceiver 122 by providing a clear indication of one or more of the beginning or end of a tone burst or tone phase shift. For example, a cycle of the timing tone 384 may have the phase shifted, and the phase shift may be indicative of a specified time.

At 906 the first satellite 102(1) sends a first timing tone 384(1) at a first time. For example, the first time may be determined using the clock system 212. The first timing tone 384 may comprise one or more tones, tone bursts, phase shift of one or more tones, and so forth. For example, the first timing tone 384 may comprise the third tone 514 and the fourth tone 516 transmitted simultaneously, a first tone burst of the third tone 514 followed by a second tone burst of the fourth tone 516, and so forth.

At 908 the second satellite 102(2) receives the first timing tone 384(1) at a second time. For example, the signal processing electronics 362 may provide the received first timing tone 384(1) to the ranging system 130 and data indicative of the second time may be determined using the clock system 212.

At 910 the second satellite 102(2) sends a second timing tone 384(2) at a third time. For example, the third time may be determined using the clock system 212. In some implementations, the sending of the second timing tone 384(2) may be responsive to reception of the first timing tone 384(1). The second timing tone 384(2) may be sent at a predetermined time interval after the second time, providing a known turnaround time. For example, the ranging system 130 may be configured to transmit a responsive timing tone 384 at a specified time to provide a deterministic latency in the turnaround time.

At 912 the first satellite 102(1) receives the second timing tone 384(2) at a fourth time. For example, the signal processing electronics 362 may provide the received second timing tone 384(2) to the ranging system 130 and data indicative of the fourth time may be determined using the clock system 212.

At 914 the first satellite 102(1) may resume low bitrate communication.

At 916 a first roundtrip time is determined based at least in part on the first time and the fourth time. For example, the first roundtrip time may comprise the difference between the first time and the fourth time, less the turnaround time.

At 918, based on the first roundtrip time a first distance indicative of the range may be determined. For example, the first roundtrip time may be divided by the velocity of light in the intervening medium to determine the range data 386 indicative of the range.

In some implementations the range may be determined using a single trip time. For example, an optical transceiver 122 may be configured to transmit a timing tone 384 at a specified time. Given accurate time synchronization and the known transmission time, the time of reception of the timing tone 384 may be used to determine the range. For example, the difference between the known transmission time and the reception time may be divided by the velocity of light in the intervening medium to determine the range.

The circuitry, processes, and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a transmitter system comprising:
   a communication interface to receive first data;
   a first signal source that generates a first signal based on the first data;
   a laser that generates light;
   a first modulator that modulates, in response to the first signal, the light to produce first modulated light;
   a second signal source that generates a second signal, wherein the second signal comprises a plurality of tones, wherein each of the plurality of tones has a different frequency;
   a second modulator that modulates the first modulated light using the second signal to produce second modulated light;
   a first amplifier that amplifies the second modulated light to produce amplified light; and
   one or more optical elements that direct the amplified light.

2. The system of claim 1, wherein the plurality of tones are mutually orthogonal and sinusoidal.

3. The system of claim 1, wherein the plurality of tones comprise:
   a first tone having a sinusoidal waveform and a frequency of about 41.666 kilohertz (kHz),
   a second tone having a sinusoidal waveform and a frequency of about 62.5 kHz,
   a third tone having a sinusoidal waveform and a frequency of about 83.333 kHz, and
   a fourth tone having a sinusoidal waveform and a frequency of about 104.166 kHz.

4. The system of claim 1, wherein the plurality of tones comprise:
   a first tone having a first frequency,
   a second tone having a second frequency,
   a third tone having a third frequency, and
   a fourth tone having a fourth frequency; and
   the system further comprising electronics to:
   generate the first tone;
   generate the second tone;
   determine second data; and
   generate one or more of the third tone or the fourth tone, based on the second data.

5. The system of claim 1, the plurality of tones comprising:
   a first tone having a first frequency, and
   a second tone having a second frequency; and
   the system further comprising electronics to:
   generate the first tone at the first frequency; and
   generate a first tone burst comprising the second tone, wherein the second tone has a duration that is an integer number of cycles.

6. The system of claim 1, further comprising:
a receiver system comprising:
   a first detector that generates a first output signal responsive to incident light;
   a second detector that generates a second output signal responsive to incident light; and
   electronics to:
      determine at a first time, based on the first output signal, the second signal;
      determine, based on the second signal, the plurality of tones;
      operate a mirror controller based on a first portion of the plurality of tones;
      determine second data based on a second portion of the plurality of tones;
      determine at a second time, based on the second output signal, the first signal; and
      determine, based on the first signal, the first data.

7. The system of claim 1, further comprising:
a receiver system comprising:
   a detector that generates an output signal responsive to incident light; and
   electronics to:
      determine a first time associated with sending a first portion of the plurality of tones;
      determine, based on the output signal, a third signal comprising a second plurality of tones;
      determine a second time associated with receiving a first portion of the second plurality of tones; and
      determine, based on the first time and the second time, range data indicative of a distance.

8. The system of claim 7, the first portion of the plurality of tones comprising one or more of: a tone burst at a first frequency, wherein the tone burst has a duration that is an integer number of cycles or a phase shift.

9. A system comprising:
a receiver system comprising:
   a first telescope that receives first light;
   a mirror that directs the first light onto a beam splitter, wherein the beam splitter directs the first light onto:
      a first detector that generates a first output signal responsive to the first light, and
      a second detector that generates a second output signal responsive to the first light; and
   an actuator, wherein the actuator operates to move the mirror; and
   electronics to:
      determine at a first time, based on the first output signal, a first signal;
      determine, based on the first signal, a first plurality of tones comprising a first tone and a second tone, wherein the first plurality of tones are associated with two or more functions including tracking, time synchronization, ranging, or low bitrate data;
      operate the actuator based on the first tone; and
      determine first data based on the second tone.

10. The system of claim 9, wherein the first detector comprises a quad cell detector, and the second detector is coupled to a single mode optical fiber.

11. The system of claim 9, the electronics further to:
   determine at a second time, based on the second output signal, a second signal; and
   determine, based on the second signal, second data.

12. The system of claim 9, wherein the first plurality of tones comprise mutually orthogonal and sinusoidal tones.

13. The system of claim 9, wherein the first plurality of tones comprise:
a first tone having a sinusoidal waveform and a frequency of about 41.666 kilohertz (kHz),
a second tone having a sinusoidal waveform and a frequency of about 62.5 kHz,
a third tone having a sinusoidal waveform and a frequency of about 83.333 kHz, and
a fourth tone having a sinusoidal waveform and a frequency of about 104.166 kHz.

14. The system of claim 9, further comprising:
a transmitter system comprising:
  a communication interface to receive second data;
  a first signal source that generates a second signal based on the second data;
  a laser that generates second light;
  a first modulator that modulates, in response to the second signal, the second light to produce first modulated light;
  a second signal source that generates a third signal, wherein the third signal comprises a second plurality of tones;
  a second modulator that modulates the first modulated light using the third signal to produce second modulated light;
  a first amplifier that amplifies the second modulated light to produce amplified light; and
  one or more optical elements that direct the amplified light to the mirror.

15. The system of claim 9, further comprising:
a transmitter system comprising:
  a first communication interface to receive second data;
  a first signal source that generates a second signal based on the second data;
  a laser that generates second light;
  a first modulator that modulates, in response to the second signal, the second light to produce first modulated light;
  a second signal source that generates a third signal responsive to the second tone, wherein the third signal comprises a second plurality of tones comprising a third tone;
  a second modulator that modulates the first modulated light using the third signal to produce second modulated light;
  a first amplifier that amplifies the second modulated light to produce amplified light; and
  one or more optical elements that direct the amplified light to the mirror; and
the electronics to:
  determine a second time associated with sending the third tone;
  determine, based on the first output signal, a fourth signal;
  determine, based on the fourth signal, a third plurality of tones comprising a fourth tone;
  determine a third time associated with receiving the fourth tone; and
  determine, based on the second time and the third time, range data indicative of a distance.

16. A method comprising:
generating, at a first device, light;
receiving, at the first device, a first signal having a first frequency;
generating, at the first device and using the light, first modulated light based on the first signal;
generating, at the first device, a first plurality of mutually orthogonal tones comprising:
  a first tone that is unmodulated,
  a second tone, wherein the second tone is modulated,
  a third tone, and
  a fourth tone;
generating, based on the first plurality of mutually orthogonal tones, a second signal;
generating, at the first device, second modulated light by modulating the first modulated light based on the second signal; and
sending, from the first device to a second device, the second modulated light.

17. The method of claim 16, wherein:
the third tone is unmodulated, and
the fourth tone is modulated.

18. The method of claim 16, wherein individual ones of the first plurality of mutually orthogonal tones have one of the following frequencies: about 41.666 kilohertz (kHz), about 62.5 kHz, about 83.333 kHz, or about 104.166 kHz.

19. The method of claim 16, further comprising:
directing, at the second device, the second modulated light onto:
  a first detector, and
  a second detector;
determining, at the second device, a first output signal using the first detector;
determining, at the second device at a first time, the second signal based on the first output signal;
determining, at the second device and based on the second signal, the first plurality of mutually orthogonal tones;
operating, at the second device, a mirror controller based on the first tone of the first plurality of mutually orthogonal tones;
determining, at the second device, first data based on the second tone;
determining, at the second device, a second output signal using the second detector;
determining, at the second device at a second time, based on the second output signal, the first signal; and
determining, at the second device, based on the first signal, the first data.

20. The method of claim 16, further comprising:
determining, at the first device, a first time associated with sending a first tone burst consisting of the second tone;
determining, at the second device, reception of the first tone burst;
sending from the second device and responsive to the first tone burst, a second tone burst to the first device;
determining, at the first device, a second time associated with reception of the second tone burst; and
determining, at the first device, based on the first time and the second time, a first distance between the first device and the second device.

* * * * *